(12) United States Patent
Fehr et al.

(10) Patent No.: US 9,206,846 B2
(45) Date of Patent: Dec. 8, 2015

(54) BALL BEARING ASSEMBLY

(71) Applicant: Nook Industries, Inc., Cleveland, OH (US)

(72) Inventors: Brian Joseph Fehr, New Franklin, OH (US); Daniel J. Piltz, Ravenna, OH (US); Alexander S. Margolin, Solon, OH (US)

(73) Assignee: Nook Industries, Inc., Cleveland, OH (US)

( * ) Notice: Subject to any disclaimer, the term of this patent is extended or adjusted under 35 U.S.C. 154(b) by 0 days.

(21) Appl. No.: 14/262,934

(22) Filed: Apr. 28, 2014

(65) Prior Publication Data

US 2015/0308503 A1 Oct. 29, 2015

(51) Int. Cl.
| F16C 43/06 | (2006.01) |
| F16C 33/58 | (2006.01) |
| F16C 19/08 | (2006.01) |

(52) U.S. Cl.
CPC .............. *F16C 33/585* (2013.01); *F16C 19/08* (2013.01); *F16C 43/06* (2013.01)

(58) Field of Classification Search
CPC ................................ F16C 43/06; F16C 19/08
USPC ......................................... 384/507–509, 512
See application file for complete search history.

(56) References Cited

U.S. PATENT DOCUMENTS

| 825,418 | A | * | 7/1906 | Oldfield | .......................... | 384/508 |
| 1,035,463 | A | * | 8/1912 | Rivett | ............................ | 384/508 |
| 5,142,929 | A | | 9/1992 | Simpson | | |
| 5,413,415 | A | * | 5/1995 | Collinsworth | ................ | 384/508 |
| 6,668,672 | B2 | | 12/2003 | Kuo et al. | | |
| 7,516,681 | B2 | | 4/2009 | Hsu | | |
| 2007/0196189 | A1 | | 8/2007 | Sugita | | |
| 2013/0199324 | A1 | | 8/2013 | Piltz | | |

FOREIGN PATENT DOCUMENTS

| EP | 2515000 A1 | 10/2012 |
| JP | 2004162767 A | 6/2004 |

OTHER PUBLICATIONS

International Search Report and Written Opinion of the Searching Authority in Related Application No. PCT/US2013/022761, dated Apr. 12, 2013.
Nook Industries, PowerTrac Precision Ball Screw Assemblies, Glossary and Technical Data, pp. 81-87, date unknown (at least as early as Jan. 24, 2012).

* cited by examiner

*Primary Examiner* — Phillip A Johnson
(74) *Attorney, Agent, or Firm* — Calfee, Halter & Griswold LLP

(57) ABSTRACT

A ball bearing assembly having a bearing ball recirculation arrangement. The ball bearing assembly includes an outer ring having an inner surface, an inner ring having an outer surface and insertable inside the outer ring along a common longitudinal axis, and an insert removably fixed in a position between the outer ring and the inner ring. The outer ring, inner ring and insert define at least one ball bearing recirculation path. At least one set of bearing balls is disposed to travel along the at least one ball bearing recirculation path.

17 Claims, 11 Drawing Sheets

BALL BEARING ASSEMBLY

BACKGROUND

A ball bearing is a type of rolling-element bearing that uses balls to maintain the separation between two elements, commonly referred to as the bearing races, or sometimes referred to as an outer ring and an inner ring. A ball bearing is used to reduce rotational friction between two or more elements and to support radial and axial loads. A ball bearing uses at least two races to contain the balls and transmit the loads through the balls. In most applications, one race is stationary and the other race is attached to a rotating assembly, such as a hub or shaft. As one of the bearing races rotates, the rotational movement causes the balls to rotate as well. With the balls in a rolling orientation, the balls have a much lower coefficient of friction as compared to the two race surfaces sliding against each other. Bearing balls tend to have lower load capacity for their size than other kinds of rolling-element bearings due to the smaller contact area between the balls and races.

A common construction type of ball bearings are those that have their balls evenly spaced and separated by a cage. A prior art ball bearing assembly 10 is illustrated in FIGS. 1 and 2. This conventional ball bearing type is a Conrad-style ball bearing. In this style, bearings are assembled by placing an inner ring 14 into an eccentric position relative to an outer ring 12, such as in FIG. 2. The two rings 12, 14 may contact at one point, resulting in a large gap opposite the point of contact. In this or similar positions, the balls 20, 22, 24, 26, 28, 30, 32 may be inserted through the gap and then evenly distributed around the bearing assembly, causing the rings to become concentric, such as in FIG. 1. The assembly 10 is completed by fitting a cage to the balls to maintain their positions relative to each other. Without the cage, the balls would eventually drift out of position during operation, causing the bearing to fail. The cage carries no load and serves only to maintain ball position. It should be understood that other Conrad ball bearings exist with one or more similar features.

Conrad bearings have the advantage that they are able to withstand both radial and axial loads, but have the disadvantage of lower load capacity due to the limited number of balls that can be loaded into the bearing assembly. However, due to this loading method and the use of a cage, the assembly will include additional space between the balls and thus the maximum amount of balls that can fit in the ball bearing is reduced to allow room for assembly and the cage.

In order to increase the radial load capacity of a bearing, the bearing can be a full complement bearing or fully loaded without the use of a cage. Another prior art ball bearing assembly 40 is illustrated in FIG. 4. Typical ball loading methods for balls in a full complement ball bearing require a groove 50, 52 in the inner ring 44 and/or outer ring 42 to the load the balls, such as shown in FIG. 3. Due to this structure, the ball bearing 40 is not fit to withstand axial loads as the balls can pop out of the groove. It should be understood that other full complement ball bearings exist with one or more similar features.

Generally, an angular contact ball bearing uses axially asymmetric races. An axial load passes in a straight line through the bearing, whereas a radial load takes an oblique path that tends to want to separate the races axially. In this construction, the angle of contact on the inner race is the same as that on the outer race. Angular contact bearings better support so-called combined loads, that is loading in both the radial and axial directions.

Single row angular contact bearings can only be loaded axially in one direction. For them to be fit to be used in both directions, a second bearing will need to be paired with the first or a double row angular contact bearing can be used. Double row angular contact bearings include two rows of bearings loaded in a face to face or back to back configuration which allow for the bearing to be loaded in both directions. FIG. 4 is an enlarged cross-sectional view of a portion of a prior art ball bearing assembly 60 in which bearing balls may be loaded in two directions. It should be understood that other double row angular contact ball bearing exist with one or more similar features.

SUMMARY

The present application describes a ball bearing assembly having a bearing ball recirculation arrangement.

In an exemplary embodiment, the ball bearing assembly includes an outer ring having an inner surface, an inner ring having an outer surface, an insert removably fixed in a position between the outer ring and the inner ring, and at least one set of bearing balls disposed to travel along at least one ball bearing recirculation path. The inner ring is insertable inside the outer ring. The outer ring, inner ring and insert may all define a portion of the at least one ball bearing recirculation path.

BRIEF DESCRIPTION OF THE DRAWINGS

Features and advantages of the general inventive concepts will become apparent from the following detailed description made with reference to the accompanying drawings.

FIG. 6b is a front view of the outer ring of FIG. 6a;

FIG. 7b is a front view of the inner ring of FIG. 7a;

FIG. 7c is a side view of the inner ring of FIG. 7a;

FIG. 8b is a side view of the insert of FIG. 8a;

FIG. 8c is a top view of the insert of FIG. 8a;

DETAILED DESCRIPTION

Figure 1:
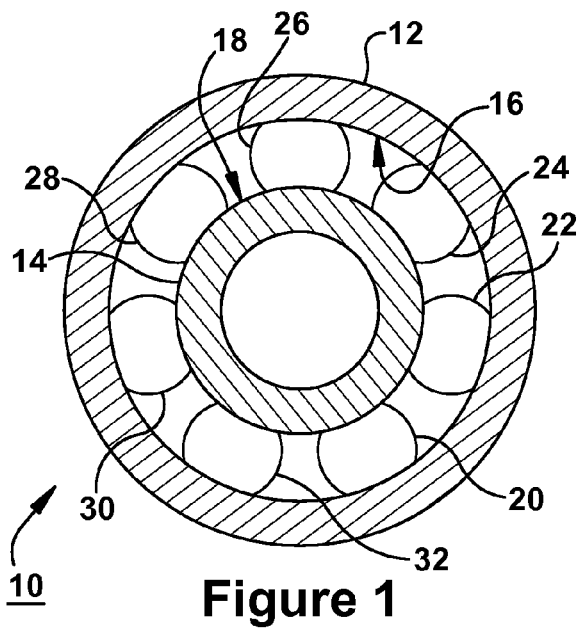
FIG. 1 is a cross-sectional view of a prior art ball bearing assembly.
Figure 2:
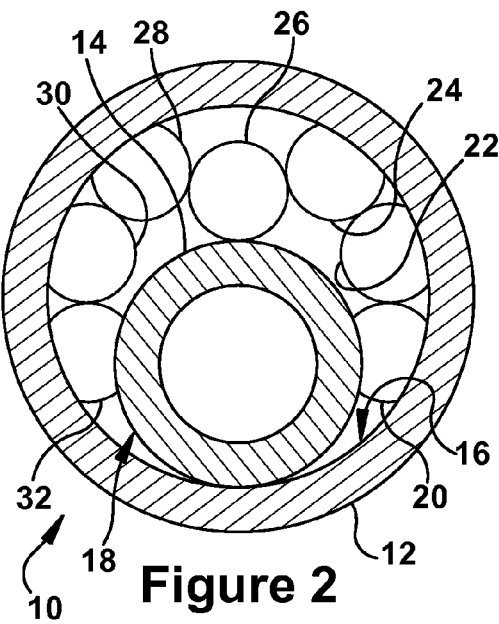
FIG. 2 is a cross-sectional view of the ball bearing assembly of FIG. 1, shown with an inner ring in a bearing ball loading position.
Figure 3:
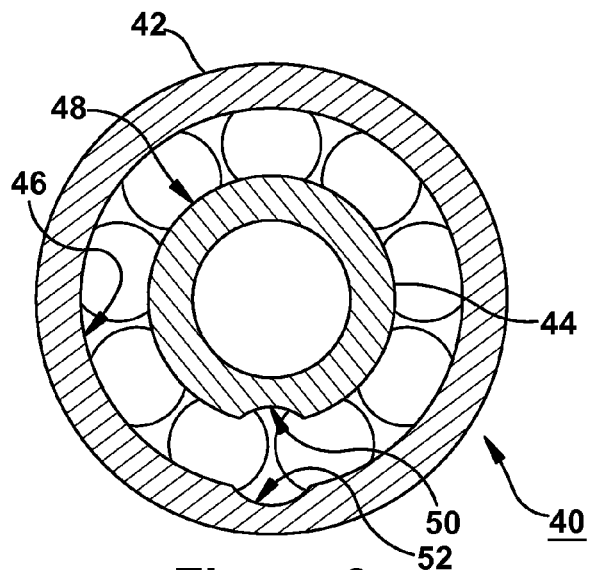
FIG. 3 is a cross-sectional view of another prior art ball bearing assembly.
Figure 4:
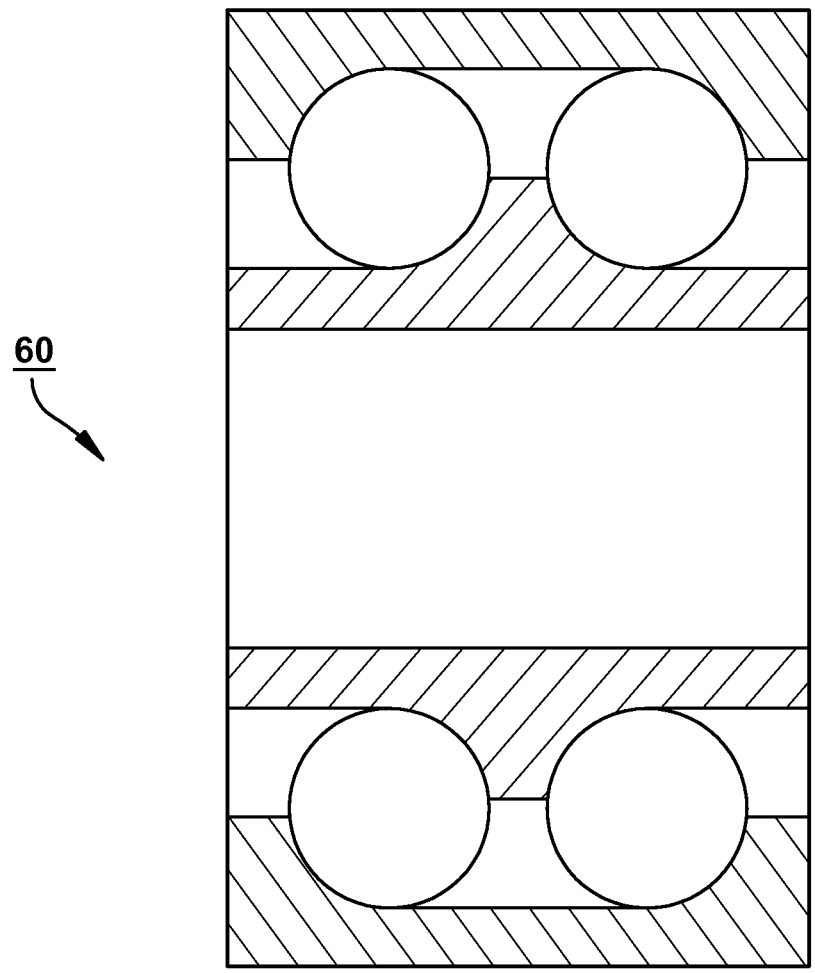
FIG. 4 is an enlarged cross-sectional view of a portion of another prior art ball bearing assembly, shown along a longitudinal axis of the assembly.

This Detailed Description merely describes exemplary embodiments in accordance with the general inventive concepts and is not intended to limit the scope of the invention or the claims in any way. Indeed, the invention as described by the claims is broader than an unlimited by the exemplary embodiments set forth herein, and the terms used in the claims have their full ordinary meaning.

The general inventive concepts will now be described with occasional reference to the exemplary embodiments of the invention. This general inventive concept may, however, be embodied in different forms and should not be construed as limited to the embodiments set forth herein. Rather, these embodiments are provided so that this disclosure will be thorough and complete, and will fully convey the scope of the general inventive concepts to those skilled in the art.

Unless otherwise defined, all technical and scientific terms used herein have the same meaning as commonly understood by one of ordinary skill in the art encompassing the general inventive concepts. The terminology set forth in this detailed description is for describing particular embodiments only and is not intended to be limiting of the general inventive concepts. As used in this detailed description and the appended claims, the singular forms "a," "an," and "the" are intended to include the plural forms as well, unless the context clearly indicates otherwise.

Unless otherwise indicated, all numbers expressing quantities of ingredients, properties such as molecular pressure source, reaction conditions, and so forth as used in the specification and claims are to be understood as being modified in all instances by the term "about." Accordingly, unless otherwise indicated, the numerical properties set forth in the specification and claims are approximations that may vary depending on the suitable properties sought to be obtained in embodiments of the present invention. Notwithstanding that the numerical ranges and parameters setting forth the broad scope of the general inventive concepts are approximations, the numerical values set forth in the specific examples are reported as precisely as possible. Any numerical values, however, inherently contain certain errors necessarily resulting from error found in their respective measurements.

The present invention relates to a ball bearing assembly having a bearing ball recirculation arrangement. The assembly is generally an angular contact bearing, and the arrangement is believed to overcome certain limitations of a prior art bearing assembly. The bearing assembly can be loaded fully with balls, i.e., a full complement arrangement, with rings in a final assembly position and the use of a groove or slot in an outer ring. An insert can be removed to insert the balls in the races, or rings, and installed to closed off the rings and maintain the balls in position. The arrangement and loading method can withstand increased axial loads, as the balls are prohibited from popping out of the assembly. The use of the insert also allows for the assembly of the bearing to have multiple rows, or more than the traditional two row angular contact bearing. Also, due to this loading method, the bearing can be assembled in such a manner as to allow each row to be loaded in both directions axially. Due to this arrangement, the bearing can potentially fit into a smaller envelope than was previously possible.

The ball bearing assembly includes an outer ring having an inner surface, an inner ring having an outer surface and insertable inside the outer ring along a common longitudinal axis, an insert removably fixed in a position between the outer ring and the inner ring, and at least one set of bearing balls. The inner surface of the outer ring and the outer surface of the inner ring are cooperatively arranged to define at least one ball bearing recirculation path. The insert has a recessed channel which defines a length of the at least one ball bearing recirculation path. The at least one set of bearing balls is disposed to travel along the at least one ball bearing recirculation path.

Figure 5:
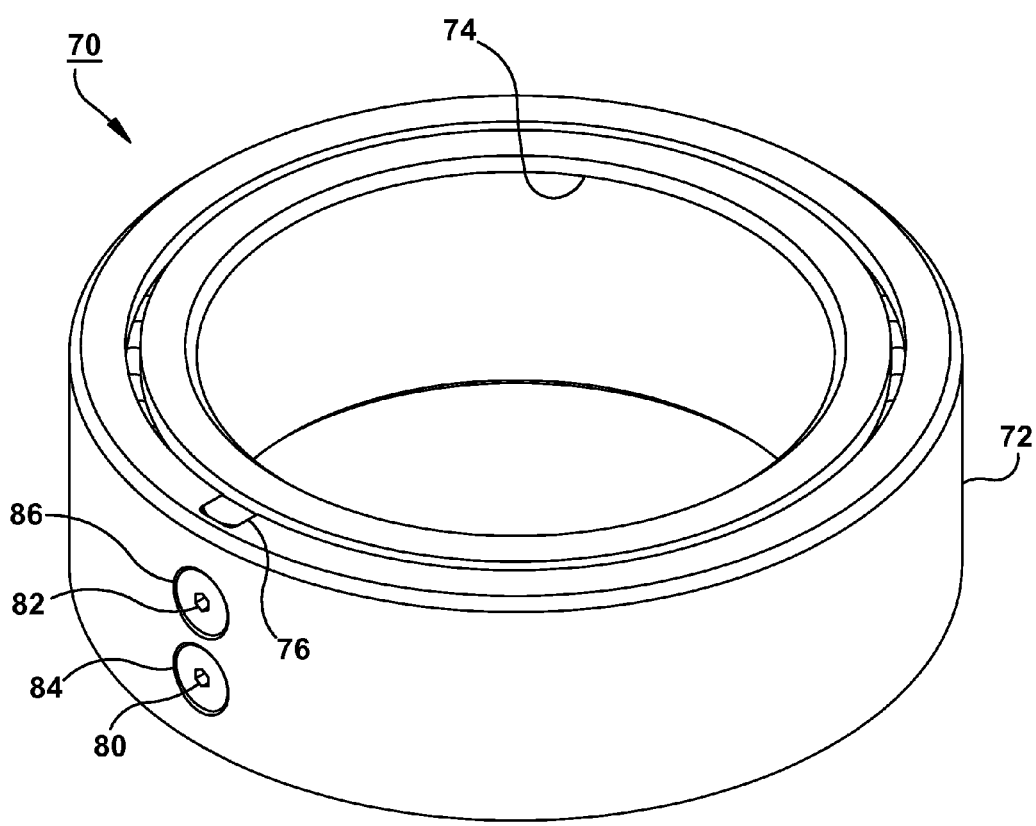
FIG. 5 is a perspective view of an exemplary embodiment of a ball bearing assembly.
Figure 9:
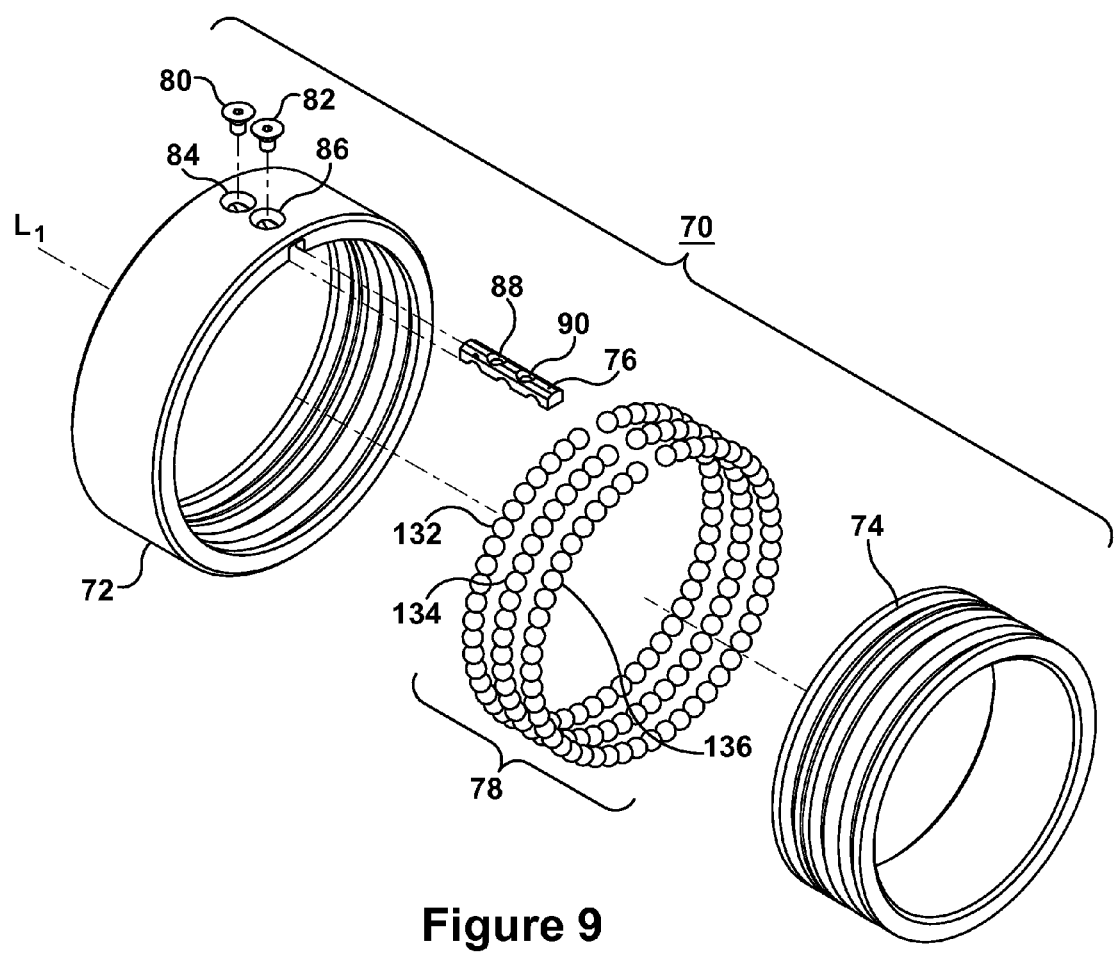
FIG. 9 is an exploded assembly view of the ball bearing assembly of FIG. 5.

Referring now to the drawings, FIG. 5 is a perspective view of an exemplary embodiment of a ball bearing assembly 70. The ball bearing assembly 70 is generally arranged for recirculation of ball bearings in three separate paths. As discussed herein, the invention may be practiced with more or less distinct paths. The ball bearing assembly 70 includes an outer ring 72, and inner ring 74, an insert 76 placed between the rings 72, 74, and three sets of bearing balls 132, 134, 136. The bearing balls 78 are best shown in FIG. 9 in an exploded assembly view of the ball bearing assembly 70. The insert 74 is secured in place between the outer ring and the inner ring by two fasteners 80, 82. The fasteners are passed through holes 84, 86 in the outer ring 72 and into holes 88, 90 in the insert 76. The fasteners 80, 82 are secured, such as for example, by a threaded connection, to the insert 76 to prohibit movement of the insert. Other known securing arrangement may be used in the practice of this invention.

Figure 6A:
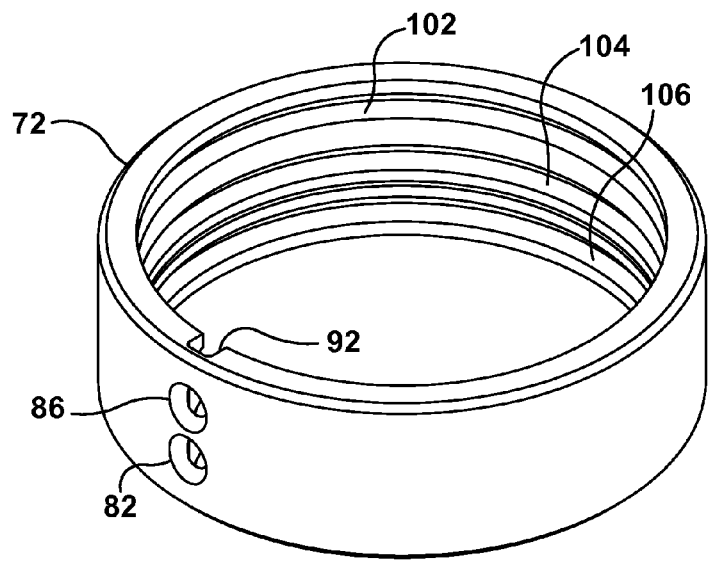
FIG. 6a is a perspective view of an outer ring of the ball bearing assembly of FIG. 5.
Figure 6B:
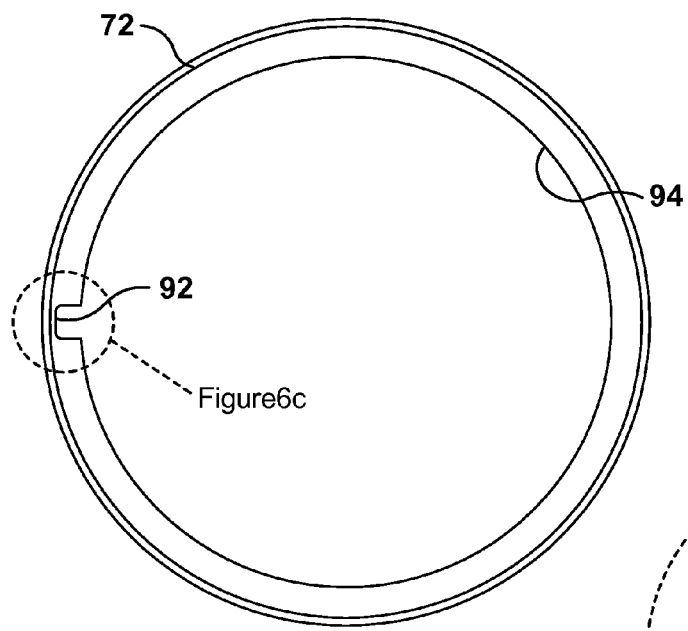
Figure 6C:
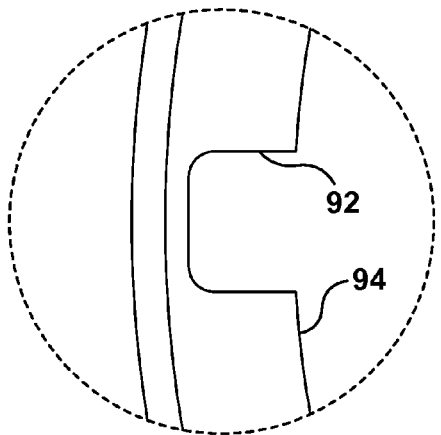
FIG. 6c is enlarged front view of the designated circular area of FIG. 6b.

Still referring to FIG. 5, the ball bearing 70 includes an outer ring 72. FIGS. 6a-6c provide various views of the outer ring 72, including FIG. 6c, which illustrates an enlarged front view of a designated circular area of FIG. 6b. In the perspective view in FIG. 6a, the inner surface 94 of the outer ring 72 is shown. Three grooves 102, 104, 106 are in the inner surface 94 of the outer ring 72. The three grooves are non-contiguous and each groove forms part of one of the three separate and distinct paths for travel of one of three separate and distinct sets of ball bearings, i.e., a ball bearing recirculation path, in the ball bearing assembly 70. Each path is a circular-shaped and in a path transverse to a longitudinal axis $L_1$ of the ball bearing assembly (see FIG. 9). That is to say, each ball bearing recirculation path is positioned at zero degrees relative to the common longitudinal axis $L_1$ of the outer ring 72 and the inner ring 74. As such, each path is equally spaced apart from an adjacent path about the total length of the entire path, and each path is an equal distance in length, forms a circle of an equal diameter, and is located an equal distance from longitudinal axis $L_1$ of the ball bearing assembly at any point along the path. As discussed herein, a different number of grooves and sets of ball bearings may be used in the practice of this invention, such as for example, the ball bearing assembly may have five sets of balls and have five separate and distinct paths for travel, one for each of the five sets.

Also as shown in the FIG. 5, the ball bearing 70 includes an inner ring 74. The inner ring is insertable inside the outer ring along a common longitudinal axis. The inner surface of the outer ring and the outer surface 96 of the inner ring 74 are cooperatively arranged to define at least one ball bearing recirculation path. In application of the ball bearing assembly 70, either the outer ring 72 may be rotationally fixed relative to the inner ring 74, or the inner ring 74 may be rotationally fixed to the outer ring 72.

Figure 7A:
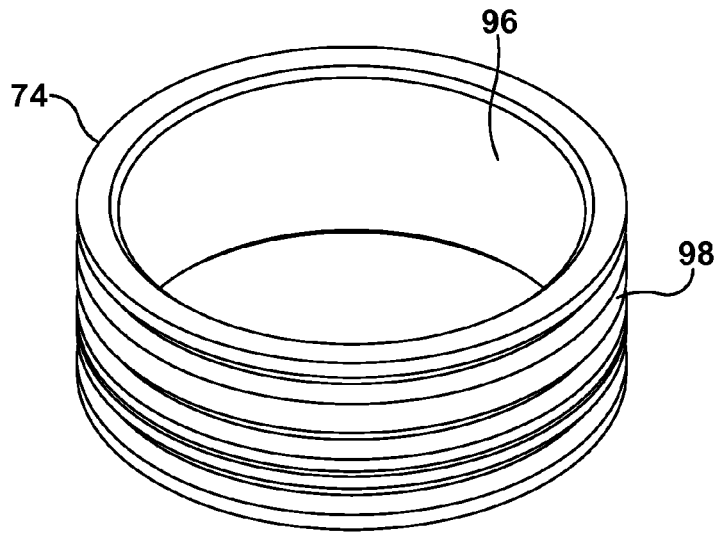
FIG. 7a is a perspective view of an inner ring of the ball bearing assembly of FIG. 5.
Figure 7B:
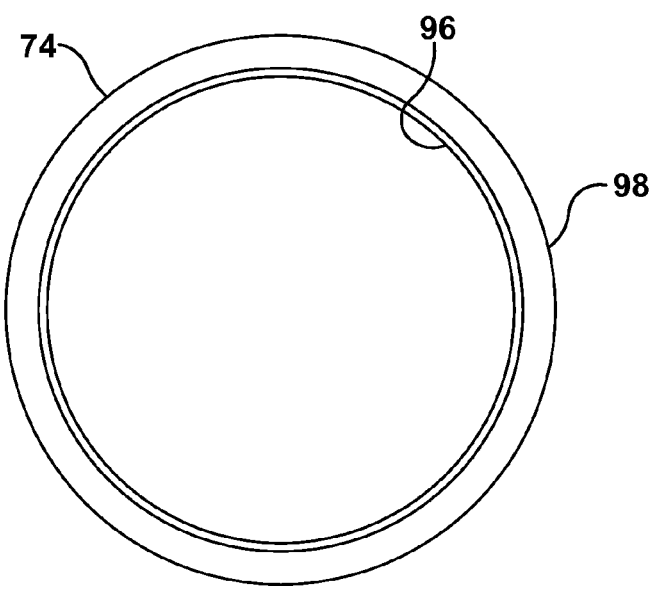
Figure 7C:
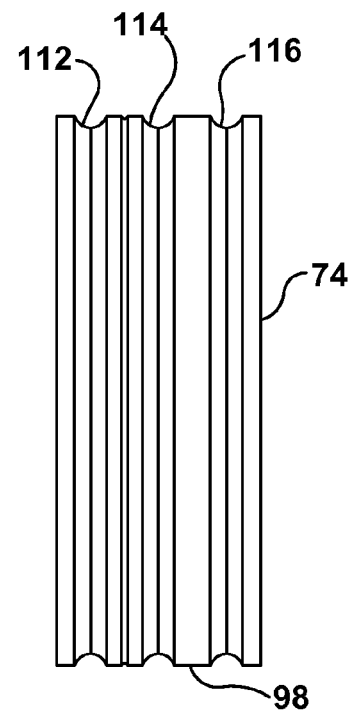

FIGS. 7a-7c provide various views of an exemplary inner ring 74. In the perspective view in FIG. 7a, the inner surface 96 of the inner ring 74 is shown. As best seen in FIG. 72, the outer surface 98 of the inner ring 74 includes three grooves 112, 114, 116. The three grooves are non-contiguous and each groove forms part of a one of three separate and distinct paths for travel of one of three separate and distinct sets of ball bearings in the assembly 70. The three grooves 112, 114, 116 are positioned to cooperatively match with the grooves 102, 104, 106, respectively, on the inner surface 94 of the outer ring 72. As discussed herein, a different number of grooves and sets of ball bearings may be used in the practice of this invention, such as for example, the ball bearing assembly may have five sets of bearing balls and have five separate and distinct paths for travel, one for each of the five sets of bearing balls.

An insert is removably fixed in a position between the outer ring and the inner ring. The insert has at least one recessed channel on one side, and the recessed channel defines a length of one ball bearing recirculation path. The inner surface of the outer ring defines a slot cooperatively shaped for housing of the insert. In this orientation, the insert is positioned between the outer ring and the inner ring and in a parallel alignment relative to the common longitudinal axis $L_1$ of the outer ring and the inner ring.

Figure 8A:
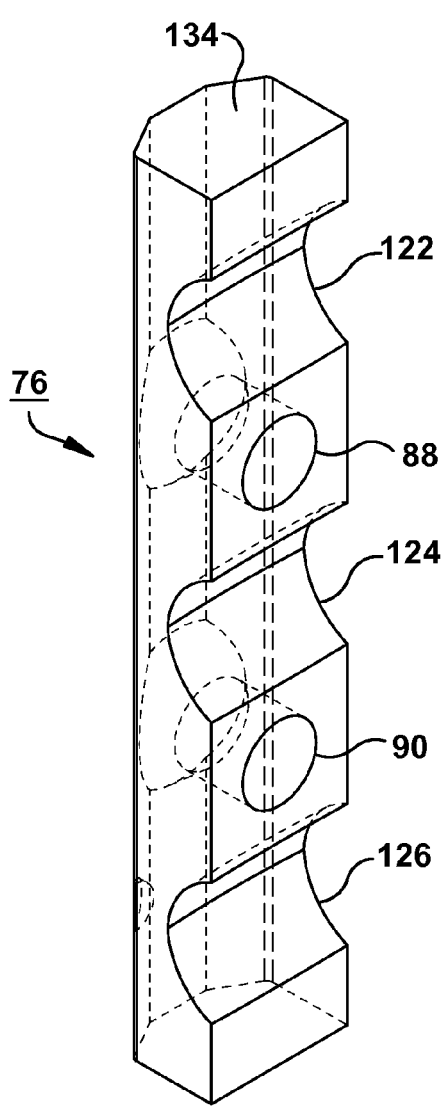
FIG. 8a is a perspective view of an insert of the ball bearing assembly of FIG. 5.
Figure 8B:
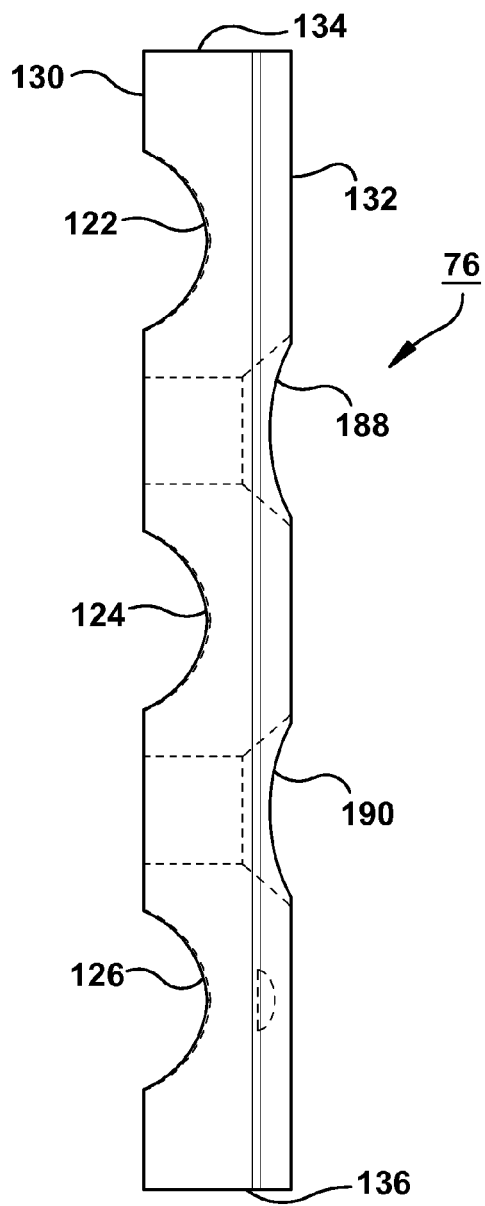
Figure 8C:
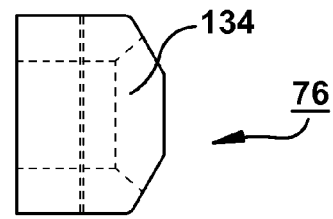

An exemplary insert 76 is shown in FIG. 5. A perspective view of the insert 76 is shown in FIG. 8a, and side and top views are shown in FIGS. 8b and 8c, respectively. The insert 76 has three recessed channels 122, 124, 126 on a first elongated side 130. Each recessed channel 122, 124, 126 is concave-shaped and is cooperatively shaped for insertion of one of the three set of bearing balls 132, 134, 136. An opposite second elongated side 132 includes slightly 188, 190 recessed cavities which act as an entry to holes 88, 90. As discussed herein, the insert 76 is secured in a position between the outer ring 72 and the inner ring 74 by hardware 80, 82 through holes 88, 90 in the insert 76. The invention may be practiced by other securing hardware or arrangements.

Figure 10:
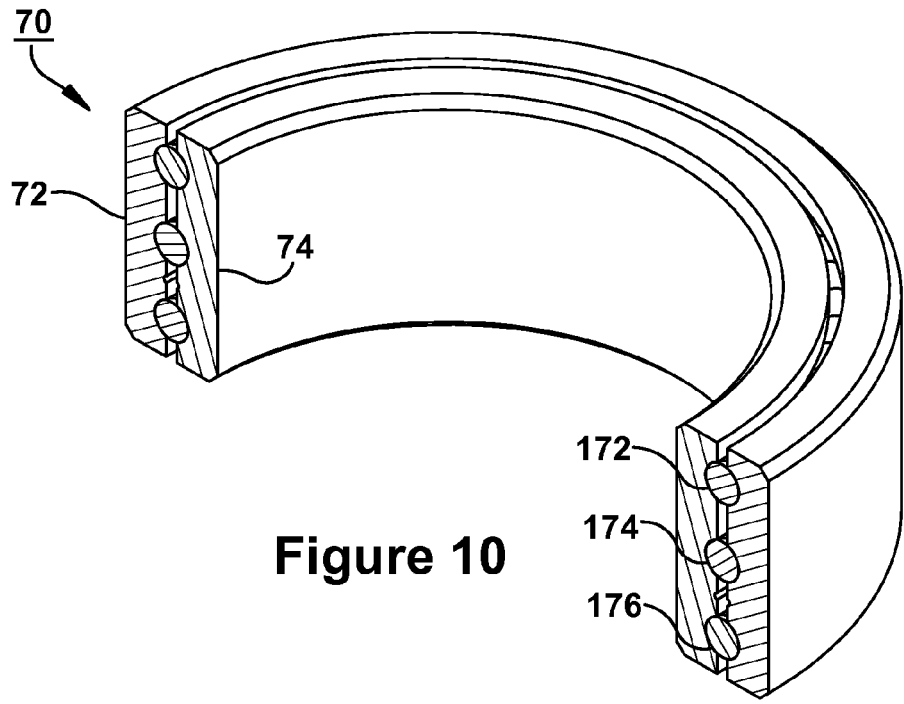
FIG. 10 is a perspective cross-sectional view of the ball bearing assembly of FIG. 5, shown along a longitudinal axis of the assembly.

FIGS. 9-17 illustrate other views of the exemplary ball bearing assembly 70 and provide additional examples of the structural arrangement discussed herein. An exploded assembly view of the ball bearing assembly 70 is shown in of FIG. 9. As illustrated, the position of the outer ring 72 and inner ring 74 is apparent about a common longitudinal axis $L_1$. The three sets of ball bearings 132, 134, 136 are placed about the same longitudinal axis $L_1$ as shown. In an assembled form, FIG. 10 illustrates a perspective cross-sectional view of the ball bearing assembly 70 along a longitudinal axis of the assembly. In this view, a portion of the three recirculation paths 172, 174, 176 are visible on one side of the assembly. Each recirculation path is defined at least in part by an outer ring 72 and an inner ring 74.

Figure 11:
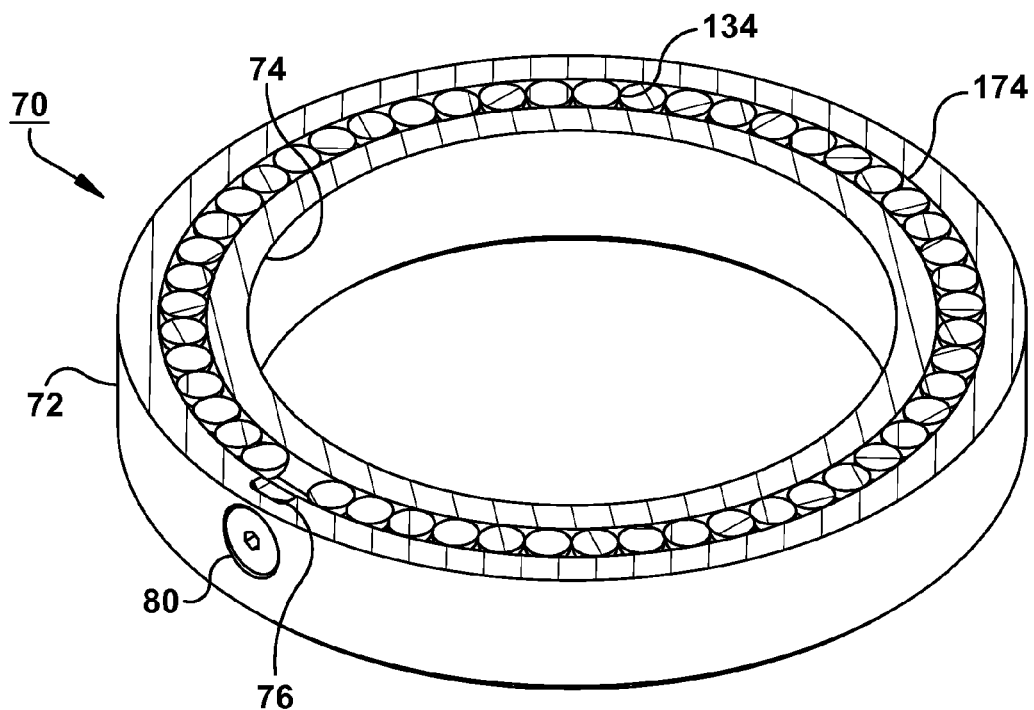
FIG. 11 is a perspective cross-sectional view of the ball bearing assembly of FIG. 5, shown along a transverse axis of the assembly.
Figure 17:
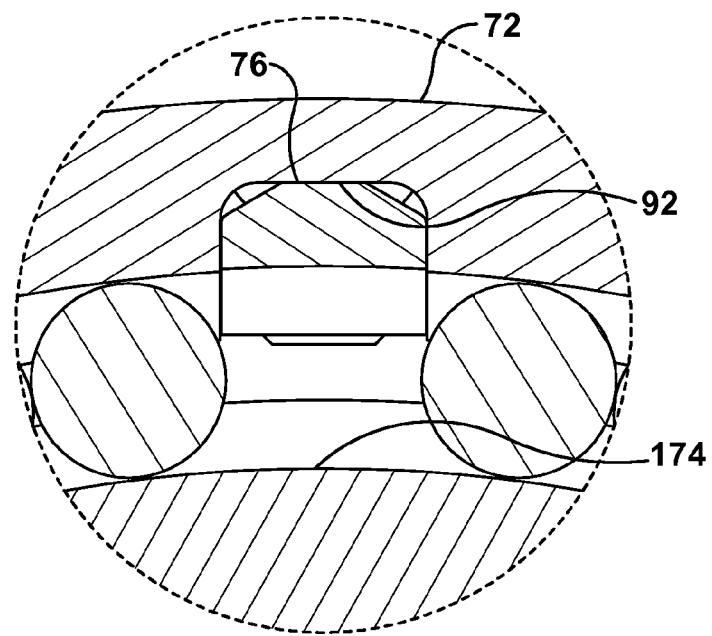
FIG. 17 is enlarged cross-sectional view of the designated circular area of FIG. 15.

The ball bearing assembly 70 is visible from another view in FIG. 11. The perspective cross-sectional view along a transverse axis of the assembly illustrates the co-axial relationship between the outer ring 72, the inner ring 74 and one set of the ball bearings 134. A front view is shown in FIG. 17 of the same cross-section. The middle groove 174 is shown in this view and is occupied by a middle set of ball bearing 134. The insert 76 is positioned in a parallel relationship with the longitudinal axis of the ball bearing assembly 70. The sectional view in FIG. 11 is shown between the screw 80 and the screw 82, as compared to the ball bearing 70 as shown in complete form in FIG. 5.

Figure 12:
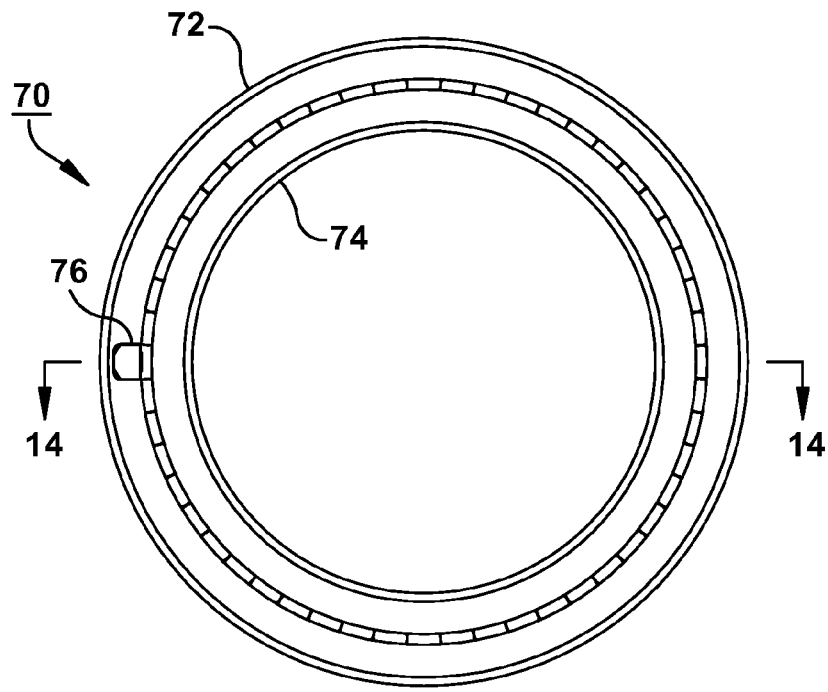
FIG. 12 is a front view of the ball bearing assembly of FIG. 5.
Figure 13:
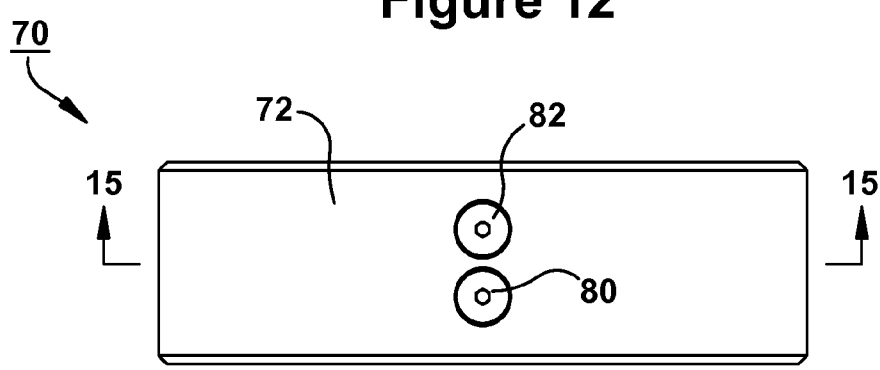
FIG. 13 is a top view of the ball bearing assembly of FIG. 5.
Figure 14:
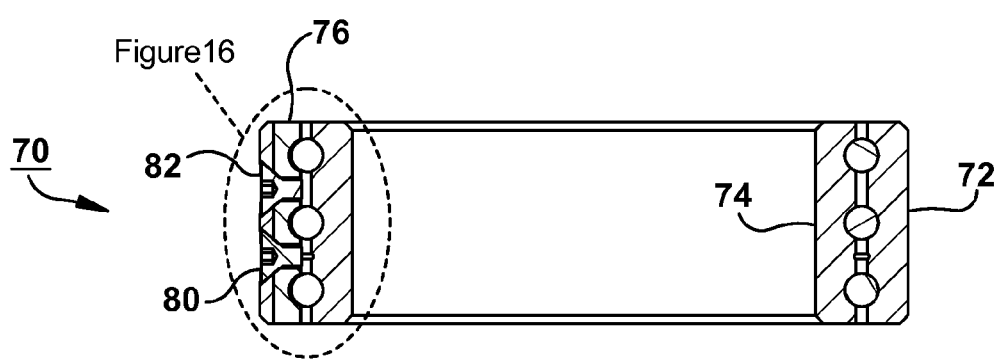
FIG. 14 is a cross-sectional view of the ball bearing assembly of FIG. 5, shown along the lines 14-14 of FIG. 12.
Figure 15:
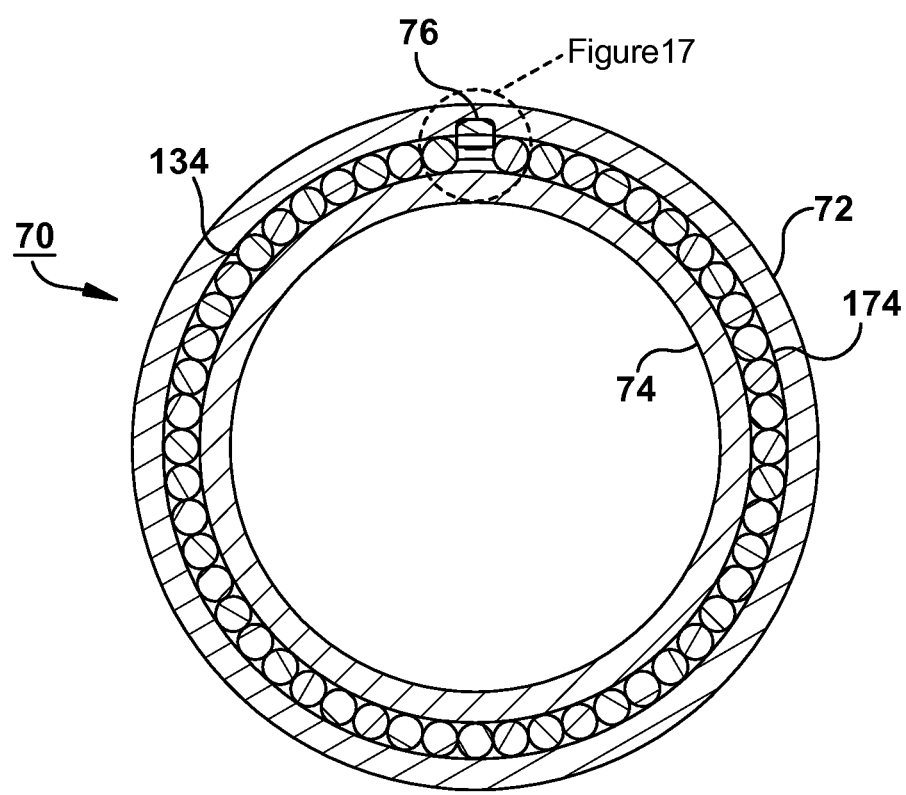
FIG. 15 is a cross-sectional view of the ball bearing assembly of FIG. 5, shown along the lines 15-15 of FIG. 13.
Figure 16:
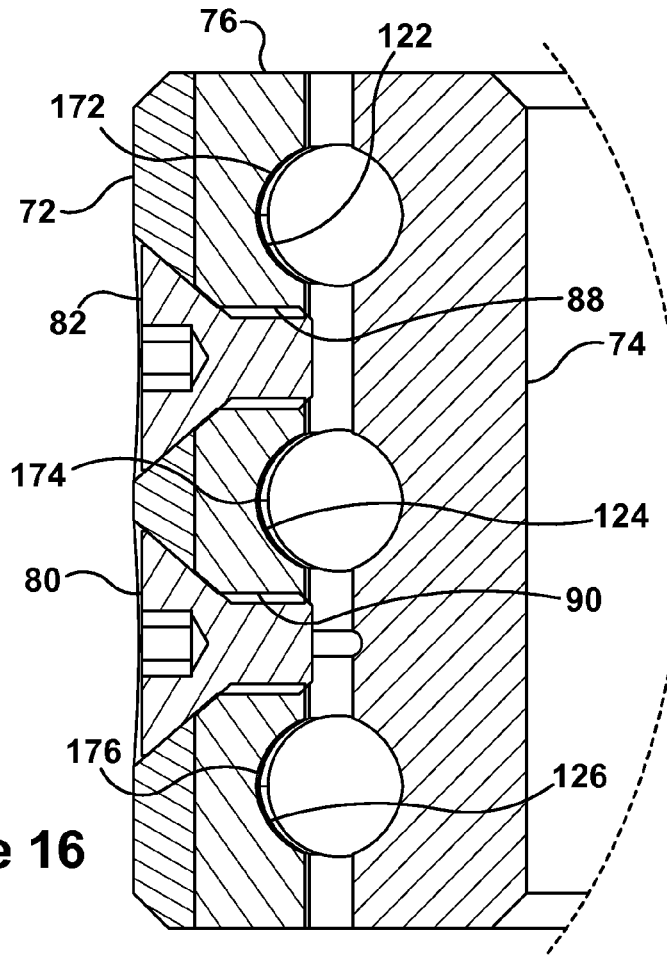
FIG. 16 is enlarged cross-sectional view of the designated circular area of FIG. 14.

Referring now to FIGS. 12-17, other views of the exemplary ball bearing assembly 70 are shown. A front view of the ball bearing assembly 70 is shown in FIG. 12 and a top view of the ball bearing assembly 70 is shown in FIG. 13. Sectional views of the ball bearing assembly 70 are shown in FIGS. 14 and 15. FIG. 14 is a cross-sectional view of the ball bearing assembly 70 along the longitudinal axis. This view is shown along the lines 14-14 of FIG. 12. The insert 76 is visible in the sectional view of the left-half of assembly. Referring now to FIG. 16, this specific area is shown in an enlarged view. Two screws 80, 82 are passed through holes 88, 90, respectively, in the insert 76 to secure the insert in a position between the outer ring 72 and the inner ring 74. The recesses 122, 124, 126 in the insert 76 cooperate with the outer ring 72 and inner ring 76 to form the recirculation paths 172, 174, 176, respectively. FIG. 15 is a cross-sectional view of the ball bearing assembly 70 similar to FIG. 11, and is shown along the lines 15-15 of FIG. 13. FIG. 17 is enlarged cross-sectional view of the designated circular area of FIG. 15. As show in FIGS. 16 and 17, the recirculation paths are spaced an equal distance apart from an adjacent path, and are each an equal distance from the longitudinal axis of the ball bearing assembly 70. With the insert 76 removed, a set of ball bearing can be loaded or unloaded in or out of the channel 92 in the outer ring 72.

A method of assembly of a ball bearing assembly will now be discussed. For exemplary purposes, the method will be discussed by making reference to the exemplary ball bearing assembly 70 as shown in the Figures. Assembly of a ball bearing assembly 70 may include positioning an inner ring 74 within an outer ring 72 along a common longitudinal axis $L_1$, with the inner surface of the outer ring 72 and the outer surface of the inner ring 74 are cooperatively arranged to define at least one ball bearing recirculation path, filing the at least one ball bearing recirculation path with a set of bearings balls, and positioning an insert 76 between the outer ring 72 and the inner ring 74. The insert has a recessed channel. The recessed channel defines a length of the at least one ball bearing recirculation path.

The method may include securing the insert between the outer ring 72 and the inner ring 74 in a removably fixed position. The method may also include filling the at least one ball bearing recirculation path with a set of bearing balls in both directions.

While various inventive aspects, concepts and features of the general inventive concepts are described and illustrated herein in the context of various exemplary embodiments, these various aspects, concepts and features may be used in many alternative embodiments, either individually or in various combinations and sub-combinations thereof. Unless expressly excluded herein all such combinations and sub-combinations are intended to be within the scope of the general inventive concepts. Still further, while various alternative embodiments as to the various aspects, concepts and features of the inventions (such as alternative materials, structures, configurations, methods, circuits, devices and components, software, hardware, control logic, alternatives as to form, fit and function, and so on) may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the general inventive concepts even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure;

however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A ball bearing assembly having a bearing ball recirculation arrangement, the assembly comprising:
    an outer ring having an inner surface;
    an inner ring having an outer surface and insertable inside the outer ring along a common longitudinal axis, wherein the inner surface of the outer ring and the outer surface of the inner ring are cooperatively arranged to define at least three bearing recirculation paths;
    an insert removably fixed in a position between the outer ring and the inner ring, the insert having a recessed channel, the recessed channel defining a length of each of the at least three ball bearing recirculation paths; and;
    at least three sets of bearing balls, each of the at least three sets of bearing balls disposed to travel along at least one of the at least three ball bearing recirculation paths.

2. The ball bearing assembly of claim 1 wherein the recessed channel of the insert is concave shaped.

3. The ball bearing assembly of claim 1 wherein the recessed channel of the insert is cooperatively shaped for insertion of at least a portion of at least one of the at least one set of bearing balls.

4. The ball bearing assembly of claim 1 wherein one of the outer ring and the inner ring is rotationally fixed relative to the other of the outer ring and the inner ring.

5. The ball bearing assembly of claim 1 wherein the at least one ball bearing recirculation path is positioned at zero degrees relative to the common longitudinal axis of the outer ring and the inner ring.

6. The ball bearing assembly of claim 1 wherein the at least one ball bearing recirculation path is circular shaped.

7. The ball bearing assembly of claim 1 wherein the at least one ball bearing recirculation path is circular shaped and positioned at a constant diameter along the circumference of the at least one ball bearing recirculation path relative to the common longitudinal axis of the outer ring and the inner ring.

8. The ball bearing assembly of claim 1 wherein the at least three bearing recirculation paths are equally spaced apart and each is positioned at zero degrees relative to the common longitudinal axis of the outer ring and the inner ring.

9. The ball bearing assembly of claim 1 wherein the insert is positioned in a parallel alignment relative to the common longitudinal axis of the outer ring and the inner ring.

10. The ball bearing assembly of claim 1 wherein the inner surface of the outer ring defines a slot cooperatively shaped for housing of the insert.

11. A ball bearing assembly having a bearing ball return arrangement, the assembly comprising:
    an outer ring;
    an inner ring insertable inside the outer ring along a common longitudinal axis; and
    an insert removably fixed in a position between the outer ring and the inner ring, the insert having at least one recessed channel;
    wherein an inner surface of the outer ring, an outer surface of the inner ring and the at least one recessed channel are cooperatively shaped to define at least one ball bearing return path, and the at least one bearing return path is positioned at zero degrees relative to the common longitudinal axis of the outer ring and the inner ring;
    wherein the inner surface of the outer ring, the outer surface of the inner ring and the at least one recessed channel of the insert are cooperatively shaped to define at least three bearing recirculation paths, each of the at least three ball bearing return paths being circular shaped and each being positioned at a constant diameter along the circumference of the return path relative to the common longitudinal axis of the outer ring and the inner ring.

12. The ball bearing assembly of claim 11 comprising at least one set of bearing balls disposed to travel within the at least one ball bearing return path.

13. The ball bearing assembly of claim 11 wherein the recessed channel of the insert is concave shaped and cooperatively shaped for insertion of at least half of at least one of the at least one set of bearing balls.

14. The ball bearing assembly of claim 11 wherein one of the outer ring and the inner ring is rotationally fixed relative to the other of the outer ring and the inner ring.

15. A method of assembly of a ball bearing, the ball bearing having a bearing ball recirculation arrangement, the method comprising:
    positioning an inner ring within an outer ring along a common longitudinal axis, wherein the inner surface of the outer ring and the outer surface of the inner ring are cooperatively arranged to define at least three ball bearing recirculation paths;
    filling each of the at least three ball bearing recirculation paths with a set of bearings balls;
    positioning an insert between the outer ring and the inner ring, the insert having a recessed channel, the recessed channel defining a length of each of the at least one ball bearing recirculation paths.

16. The method of claim 15 comprising the step of securing the insert between the outer ring and the inner ring in a removably fixed position.

17. The method of claim 15 comprising the step of filling each of the at least three ball bearing recirculation paths in both directions with the set of bearing balls.

* * * * *